United States Patent [19]
LaMontagne

[11] 3,973,118
[45] Aug. 3, 1976

[54] ELECTRO-OPTICAL DETECTOR ARRAY AND SPECTRUM ANALYZER SYSTEM

[76] Inventor: Joseph Alfred LaMontagne, 63 Chestnut St., Andover, Mass. 01810

[22] Filed: Mar. 25, 1975

[21] Appl. No.: 561,882

[52] U.S. Cl. ............................. 250/226; 250/209; 250/239; 356/178; 356/186; 356/222
[51] Int. Cl.² ...................... G01J 3/38; G01J 3/50
[58] Field of Search .......... 250/226, 208, 209, 229, 250/578, 237, 239; 356/176, 177, 178, 186, 222, 225

[56] References Cited
UNITED STATES PATENTS

| | | | |
|---|---|---|---|
| 2,744,200 | 5/1956 | Taylor | 356/178 X |
| 3,512,893 | 5/1970 | Faulhaber et al. | 250/226 X |
| 3,703,337 | 11/1972 | Neugroschel et al. | 356/178 |

FOREIGN PATENTS OR APPLICATIONS 522,028  6/1940  United Kingdom................ 250/226

*Primary Examiner*—Eugene La Roche
*Attorney, Agent, or Firm*—William Nitkin

[57] ABSTRACT

An electro-optical detector array and spectrum analyzer system consisting of a novel detector array containing a plurality of photodetectors, each covered by a different narrow band optical filter and each activated when an electromagnetic energy source admitted by the narrow band optical filter is present whereby discrete components of the electromagnetic energy can be identified simultaneously and nearly instantaneously by comparison with the known wavelength admittance characteristics of said narrow band optical filter. Companion electronics and associated metering equipment complete the system.

7 Claims, 7 Drawing Figures

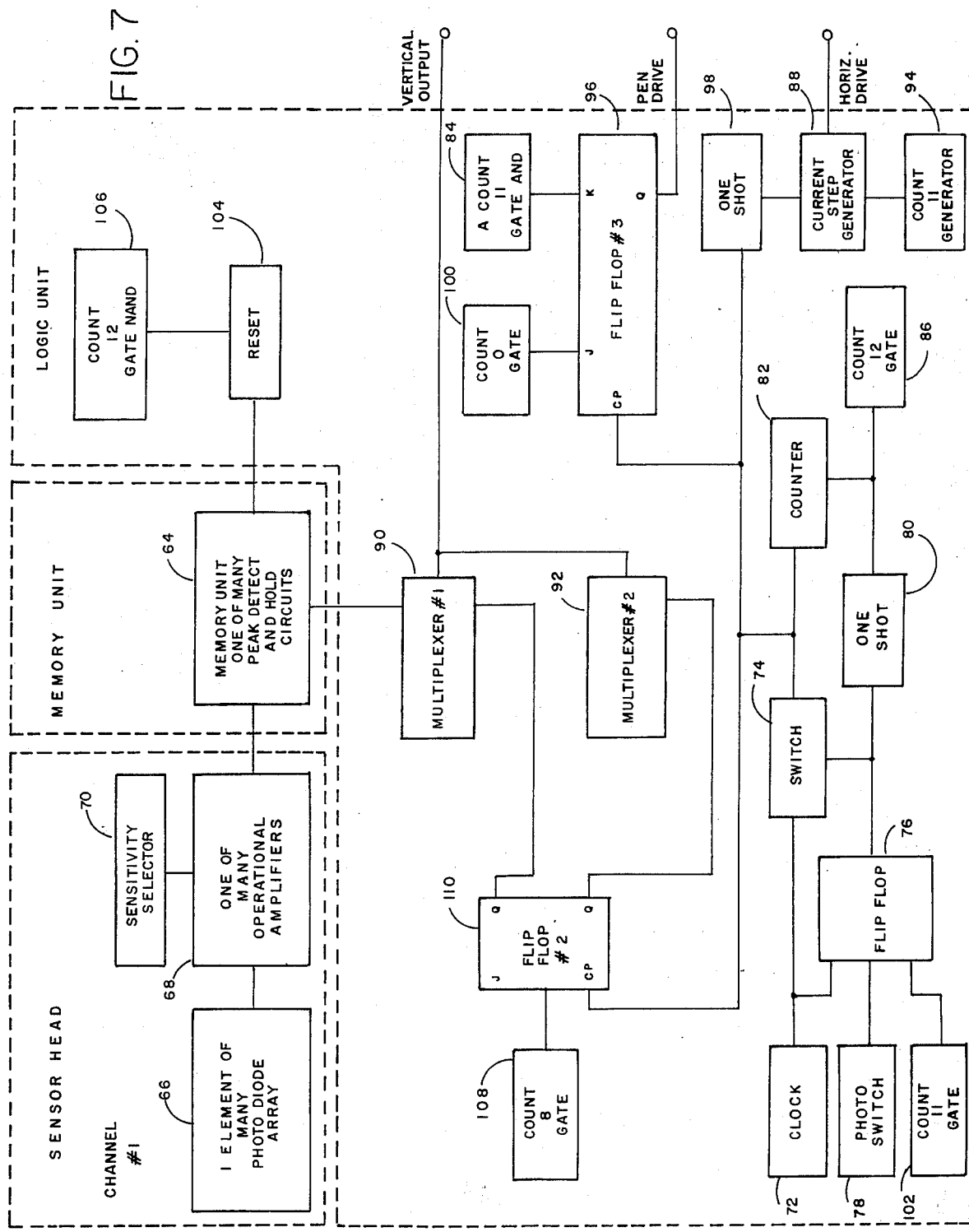

ELECTRO-OPTICAL DETECTOR ARRAY AND SPECTRUM ANALYZER SYSTEM

BACKGROUND OF THE INVENTION

1. Field of the Invention

The device of this invention resides in the field of electro-optical spectrometry and more particularly relates to spectrometry apparatus utilizing an array of photodetectors in combination with a plurality of narrow band optical filters.

2. Description of the Prior Art

There are several methods presently available to analyze the component wavelengths of the electromagnetic spectrum. Prism and diffraction grating spectrophotometers are well-known in this art. Also a photodetector used in conjunction with an optical filter is presently in use to detect specific wavelengths of the electromagnetic spectrum and may measure their intensity. One example of such a use is in pollution monitors used in manmade satellites orbiting the earth. A combination of photodetectors and optical filters is also used in color printing analyzers where the filters are moved individually into the light path and in front of the photodetector.

SUMMARY OF THE INVENTION

The present invention is a device containing a plurality of electromagnetic wavelength photodetectors each covered by a narrow band optical filter each with different filtering characteristics. Depending on the number of photodetectors and the selection of narrow band optical filters covering each photodetector, different electromagnetic energy wavelengths can be detected. Once the photodetector is penetrated by the wavelength, the photodiode chip within the photodetector causes a current to flow which is then detected by whatever metering means are employed. When an electromagnetic wavelength source is present containing one or more wavelengths, wavelengths which can penetrate one of the many narrow band optical filters are detected and can be identified by comparison with the known characteristics of the narrow band optical filter through which they passed. By using this device, one can isolate and identify very narrow portions of an electromagnetic energy source. By the use of a plurality of different narrow band optical filters each filtering a different wavelength, one can determine the presence or absence of many wavelengths simultaneously and nearly instantaneously. By placing on each photodetector a narrow band optical filter possessing particular filtering characteristics, one can create an electromagnetic analyzer for many different uses.

An amplifier may be attached to the electrically conductive pins of the photodetector array to amplify the signals from each photodetector to the metering means and a logic system can be attached to the amplifier to level the response of each photodetector in order to aid in balancing the signals due to inaccuracies such as source fluctuation, changes in amplifier gain and changes in linear sensitivity of each photodetector. Also a memory unit can be used in conjunction with the device of this invention to retain readings from the photodetectors for comparison when signals are of very short duration, such as in high speed strobed illumination sources.

The photodetectors each having a linear response may also be used for electronically determining the spectral intensity of individual portions of an electromagnetic energy source being analyzed by having such response register on an appropriate metering device that will indicate intensity readings from the amount of current passing through each photodetector.

The photodetectors, and their associated filters, may vary in surface area from one another to achieve a balance of output signals due to the differing sensitivity of the photodetectors to various segments of the electromagnetic spectrum. The surface areas of the photodetectors can be adjusted to provide an inverse responsivity characteristic thus flattening the response of the array throughout the selected spectral range.

Another embodiment of this invention is an array of photodetectors and narrow band optical filters, each sectorial, that is, each having the shape formed by two radii and the included arc of a circle. These sectorial photodetectors and narrow band optical filters are arranged around a point in such a way that their respective arcs form a circle. This arrangement has the advantage in that when it is used to detect wavelengths of the electromagnetic spectrum in an optical system, more wavelengths can be focused in the same area at the center of the array, thus being detected simultaneously without the shifting back and forth that might be necessary with a device having a linear arrangement of photodetectors.

The device of this invention can be used to detect very small differentiations in color which may not be visible to the eye and assist in electronic and repeatable color matching.

In color printing systems the device of this invention can be used to determine wavelengths present and has the advantage of being a small stationary probe which does not require moving. In such a system a memory unit could be applied to the device of this invention to allow comparison with a preset standard to assure uniformity of results.

The device of this invention can be used as a thermal detector to provide a simplified means for the electronic remote control of temperature by analyzing the source's electromagnetic radiant output.

The device of this invention can also provide a simplified means of making optical density measurements with a high degree of accurate repeatability due to the stability inherent in its solid state construction. The device of this invention can also determine the optical reflectance and optical transmission qualities of an object in a simplified manner.

When narrow band optical filters designed to function at the peak emission portions of the reflected electromagnetic radiation of mature vegetation are used, the device of this invention may act as an electronic vegetation maturity detector. In this use many electromagnetic spectrum analyzers could be placed in fields of crops and feed back to a central point where they could be remotely read. These devices would indicate which portions of a field of crops are ripe without the necessity of personal examination.

The device of this invention, when used with narrow band optical filters designed to function in the peak emission portions of the electromagnetic spectrum for pollutants desired to be detected, may be used as a miniature solid state pollution detector.

This device may also be used as an electronic phosphorescence detector by using narrow band optical filters designed to function in the near ultraviolet portion of the electromagnetic spectrum. It is anticipated that this invention can have biological applications such as identification of wavelengths emitted by certain stained cells under study so as to help in identification of material within the cell. The device of this invention could be used for quick readings directly from a microscope by placing the device directly over the eyepiece thereby avoiding the longer process necessary with present spectrophotometers.

Another use of the device of this invention is as an abridged spectrophotometer. When a sufficient number of photodetectors are used with different narrow band optical filters, enough separate wavelengths can be determined so as to identify the element under study. Although the device of this invention may not recognize all the wavelengths emitted by each element, there are certain key wavelengths which can be searched for and, if found, would identify particular elements as being present.

BRIEF DESCRIPTION OF DRAWINGS

FIG. 7 is a typical schematic diagram in block format illustrating the device of this invention used in conjunction with conventional metering means, amplifiers, logic units and memory units.

DESCRIPTION OF THE PREFERRED EMBODIMENT

Figure 1:
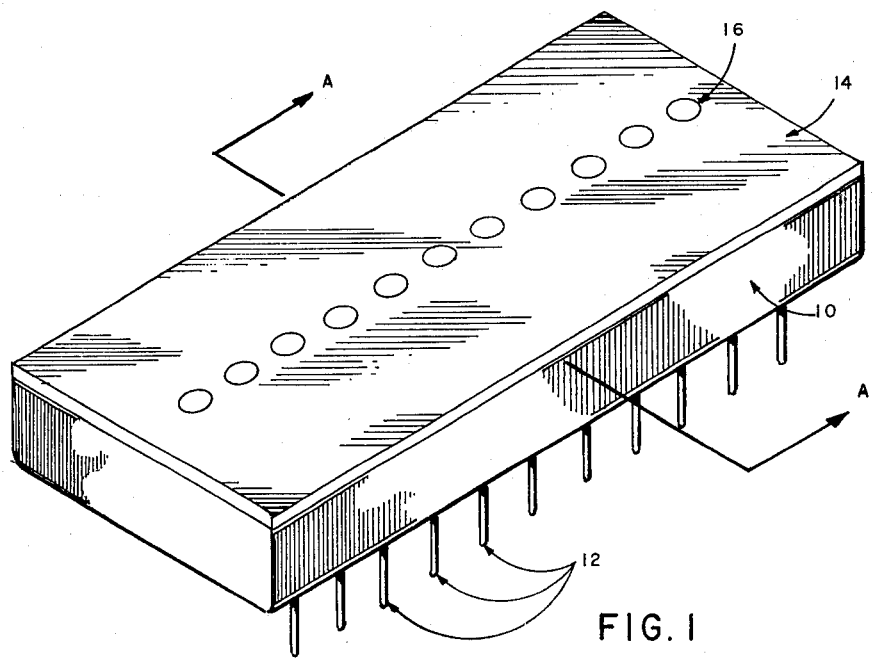
FIG. 1 is a perspective view of the device of this invention in fabricated form.
Figure 2:
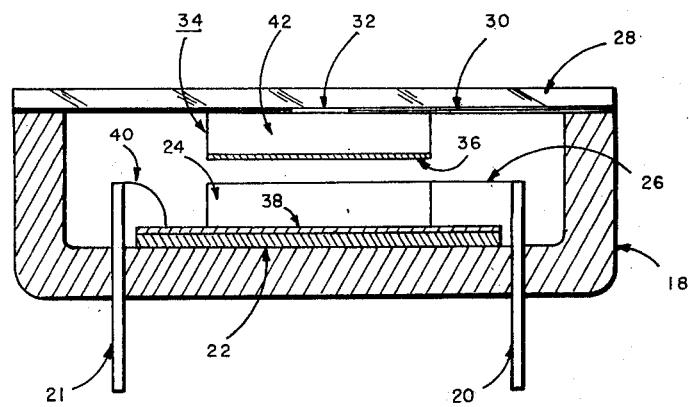
FIG. 2 is a cross-sectional view of the device of this invention taken through line A—A of FIG. 1.

With reference to the drawings, the device of this invention is illustrated in FIG. 1 as being comprised of a rectangular housing 10 containing feed-through pins 12 and having over its opening a top cover 14 with uncoated areas indicated generally by reference character 16. As illustrated in FIG. 2, the invention consists of a shallow molded rectangular housing 18 composed of a material which blocks all transmission of electromagnetic waves with pins 20 and 21 passing through it, in which is bonded a substrate 22. Bonded to the top portion of this substrate are photodetectors 24. An electrical wire 26 attaches from each photodetector to an adjacent pin, in this case, pin 20. This assembly is covered by a top cover 28 composed of a material which will allow the transmission of electromagnetic waves whose underside has been coated. This coating 30 shields the passage of radiated energy for the portion of the electromagnetic spectrum being analyzed, with the exception of an uncoated area 32 directly above each individual photodetector. To the underside of this top cover are bonded narrow band optical filters 34 with their coated sides 36 facing downward away from the top cover 28. This top cover is bonded in place over the opening of the rectangular housing with an airtight seal.

The device of this invention is constructed by bonding the substrate 22 which can be made of glass or other equivalent material to the inside bottom of the rectangular housing 18. It has been found that an epoxy type bonding agent is best suited for this bonding. The remaining exposed surface of the substrate 22 is metalized with gold or other equivalent conductive material 38. The photodetectors 24 are then bonded in place to the conductive surface 38 of the substrate 22 for which bonding gold epoxy has been found best suited but other bonding methods can also be employed. The photodetectors employed can be photodiode chips such as RCA type 630850 silicon photodiodes or equivalent. An electrically conductive wire 26 is attached from the photodetector 24 to the pin 20. For this bonding there are three methods which will produce satisfactory results and these are (a) ultrasonic bonding, (b) thermal bonding and (c) gold epoxy bonding. Equivalent bonding methods can also be used. The material for the electrically conductive wire 26 can be either gold or aluminum or equivalent with equally good results produced. After all photodetectors have been bonded to the substrate 22 and attached by electrically conductive wires to their respective pins in the above manner, one or more electrically conductive wires as illustrated by wire 40 are bonded from the conductive surface 38 of the substrate 22 to one or more pins as illustrated by pin 21. At this point the appropriate narrow band optical filters 34 are bonded to the top cover 28 whose underside surface has been coated with an optically opaque material 30 such as black chromium deposit, with the exception of the uncoated areas, as illustrated by area 32, under which each narrow band optical filter 34 is centered and bonded, for which bonding optically clear epoxy cement or equivalent has been found best suited. These narrow band optical filters are well-known in the art and are usually made by depositing on a glass base 42 a thin film coating whose index of refraction is known. Such depositing is usually accomplished by a vacuum deposition technique. Examples of such materials deposited are zinc sulfide, silicon monoxide, titanium oxide, all of which have high indexes of refraction and magnesium fluoride and thorium fluoride which have low indexes of refraction. Many other materials can be used. The wavelength transmittance characteristics of each narrow band optical filter is dependent upon the composition of the deposition on the glass base of the narrow band optical filter. Although the electromagnetic wave band widths admitted by the narrow band optical filters can vary, it is not desired to place limitations upon the narrowness of the wavelength admittance characteristics of each narrow band optical filter. At this point in the assembly operation the top cover 28 is bonded to the opening of the rectangular housing 18 with the attached narrow band optical filters 34 enclosed within the housing. For this bonding optically opaque epoxy cement has been found best suited. This last assembly operation is best accomplished in a mild vacuum environment to prevent the entrapment of corrosive elements within the assembly and likewise to insure a good airtight seal of the entire device. An alternative method of sealing the top cover 28 to the opening of the rectangular housing 18 is to fill the housing with immersion oil and then to seal the top cover to the rectangular housing. This latter procedure has the effect of cutting down wave scatter and also of assisting in giving an airtight seal.

Figure 3:
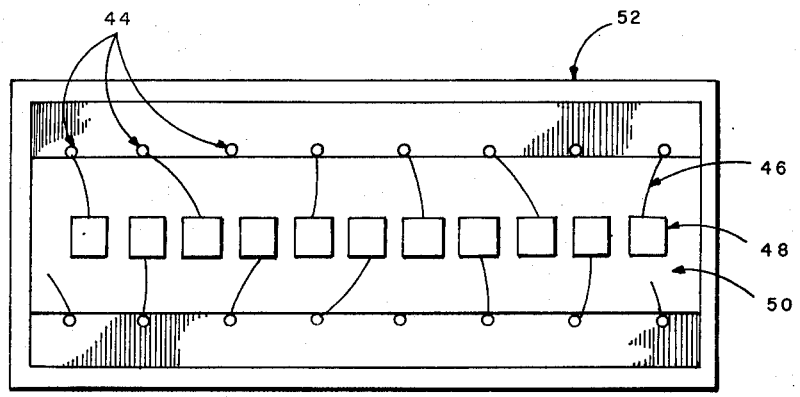
FIG. 3 is a top view of the device of this invention with top cover and narrow band optical filters removed.

FIG. 3 illustrates a top view of the device of this invention with the top cover and narrow band optical filters removed showing rectangular housing 52 containing photodetectors, one of which is indicated by 48, mounted upon the conductive surface of substrate 50 and connected by electrical wire 46 to a feed-through pin, some of which are indicated by 44.

Figure 4:
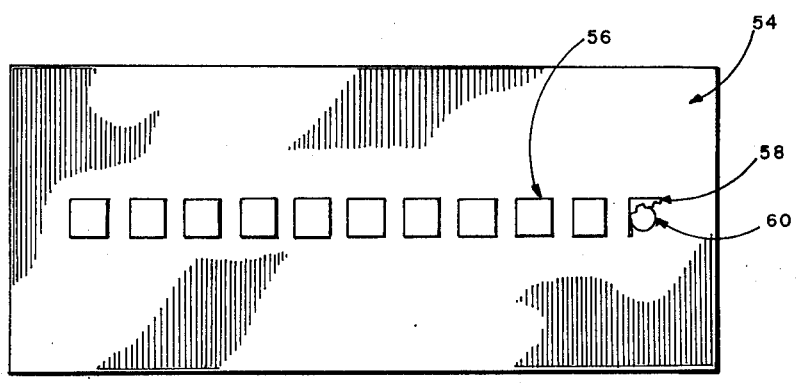
FIG. 4 is an illustration of the underside of the top cover with narrow band optical filters mounted and with one narrow band optical filter partially broken away exposing an uncoated area of the top cover.

FIG. 4 is an illustration of the underside of the top cover showing the optically opaque material 54 on the underside of the top cover, uncoated area 60 seen under the cutaway section of narrow band optical filter 58. A whole narrow band optical filter is indicated by 56.

Figure 5:
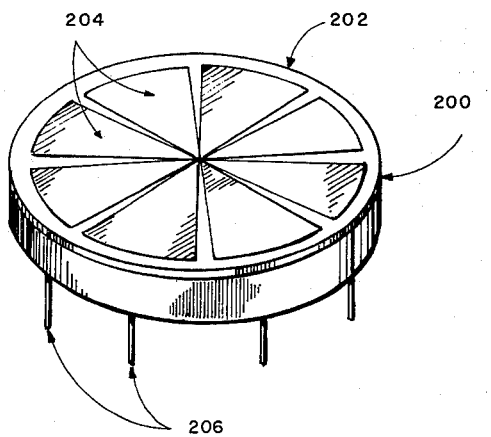
FIG. 5 illustrates an alternative circular configuration of the device of this invention wherein said narrow band optical filters are substantially sector-shaped.

FIG. 5 depicts a perspective view of an alternative circular configuration of the device of this invention wherein the narrow band optical filters 204 are sector-shaped and arranged under the surface of the top cover 202 which is sealed unto a circular housing 200. Feed-through pins 206 are shown extending from the bottom of said circular housing.

Figure 6:
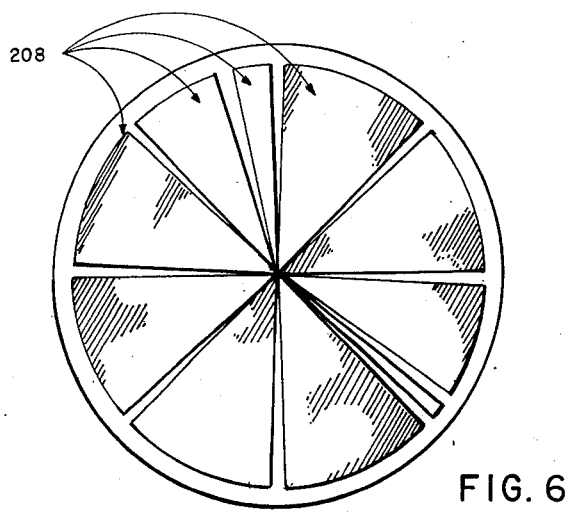
FIG. 6 illustrates an alternative configuration of the device of this invention wherein the narrow band optical filters are of varying surface areas.

FIG. 6 depicts a top view of the device of this invention with narrow band optical filters 208 of different surface areas.

FIG. 7 depicts a sample circuit in block diagram format. Other circuits can also be used in conjunction with the device of this invention. This circuit is illustrative of merely one type of companion electronics and is set out as an example. The block diagrams illustrate a circuit which can be used in the detection of a pulsed light source undergoing spectral response testing.

The output voltage of each filtered photodiode chip 66 and operational amplifier unit 68 labeled as sensor head enters a peak, detect and hold circuit 64 also referred to herein as memory unit. These peak, detect and hold circuits can consist of two Fairchild 741 operational amplifier units or equivalent and a holding capacitor of about 0.5 micro farads which capacitor can be varied depending on the desired hold time. The sensitivity selector 70 consists of a single resistor which forms a feedback loop. A resistor of higher or lower resistance can also be used in order to change the selectivity. Upon command from flip-flop No. 2 110 multiplexers such as Fairchild 3705/8 channel or equivalent No. 1, 90 and No. 2, 92 sequentially scan the signal from each peak, detect and hold circuit. The resulting signal can be monitored directly by an oscilloscope or can provide the vertical drive for a chart recorder. A reset 104 and a count 12 nand gate 106 are used in conjunction with the memory unit.

When power is applied to the logic unit, a clock 72, Signetics NE566 or equivalent, generates a pulse at a desired frequency which can be controlled by the changing of its timing resistors. The clock pulse is held from the remainder of the circuitry by an electronic switch 74 which can be a Fairchild 7460 or equivalent until a command is received from flip-flop No. 1, 76 which can be a Fairchild 74H102 or equivalent. The command is only given when the photoswitch 78, consisting of a free, unfiltered photodiode element and its operational amplifier, detects a desired light level whose flux level is set with a trim-pot at the amplifier offset null. At this time the photoswitch provides an output voltage sufficient to trigger the "J" gate of flip-flop No. 1. Output "Q" of flip-flop No. 1 goes high activating the switch 74 and the monostable multivibrator illustrated as "one shot" 80. The "one shot" fires a single negative pulse to ground, resetting the binary counter 82 to zero. The counter now begins counting clocked pulses which are entering the circuit through the switch. The outputs of the binary counter will each center a high or low state depending on the specific number of clocked pulses that have been reached. This output condition can only exist after eleven clock pulses have been counted in a circuit with an eleven element photodiode array used here only as an example since said array can have any number of filter-photodiodes. Using "and" gate 84 such as a Fairchild 7411 or equivalent and nand gate 86 such as a Fairchild 7420 or equivalent to add these outputs, a signal can be achieved as in the example above or from any other count desired.

Provisions can be made in the logic unit to allow for the use of chart recorders. The horizontal drive consists of a simple current step generator 88 made up primarily of a Fairchild 74121 "one shot" 98 or equivalent. It will generate a stair step pattern until the count 11 gate 94 from the binary counter 82 resets it to zero. Vertical output is the output of the Fairchild 3705 multiplexers or equivalent shown as 90 and 92. The pen drive circuit is designed to cause the chart recorder to leave a single mark at the upper end of its travel for each channel. A flip-flop Fairchild 74H102 96 or equivalent is provided for this purpose and is operated by the binary counter 82. The count 11 gate causes output "Q" to go low. At this point the pen will drop to a position corresponding to the output level for that specific channel. The count zero gate 100 will return the pen to its up position.

MODE OF OPERATION OF INVENTION

The following sequence of events takes place when the device of this invention is operating. First the electromagnetic energy from the source to be measured or monitored strikes the top cover 28 surface. The coating on this top cover allows the energy to pass only through the uncoated areas 32. Electromagnetic energy then proceeds to the coating on the narrow band optical filters, one of which is illustrated by 36, which in turn proceed to block the passage of all electromagnetic waves with the exception of that portion of the electromagnetic spectrum for which the particular narrow band optical filter has been designed to allow passage. This portion of the electromagnetic spectrum which has been allowed passage through the various narrow band optical filters then strikes the sensitized surface of the photodetectors, one of which is illustrated as 24. The photodetectors, being thus excited, rearrange their atomic structure so as to cause the flow of electrical current between the substrate's electrically conductive surface 38 and the electrically conductive wire 26 connection. This electrical current can then be monitored by attaching an appropriate metering device to the electrically conductive pins, two of which are illustrated by 20 and 21, from which such information is desired. Since there is a direct and known correlation between the electromagnetic energy received by the photodetectors and the subsequent quantity of electrical current flowing through the substrate's electrically conductive surface and the electrically conductive wire 26, very accurate data can be determined relative to the electromagnetic energy source by relating the electrical current from the photodetectors to each other. Accurate data can also be gathered relating to the portion of the electromagnetic spectrum with the greatest energy content and the relative energy content for each portion of the electromagnetic spectrum isolated by the narrow band optical filters of the invention.

The arrangement of the invention shown in FIGS. 1, 2, 3, 4, 5, 6, and 7 may be modified to suit other determinations required of the invention such as size and quantity of the filter-photodetector array, the arrangement of said filter-photodetector array and the companion electronic circuitry. Numerous changes in the details of construction and the combination and arrangement of parts are possible without departing from the spirit and scope of the invention as hereinafter claimed.

What is claimed is:

1. A device for optically detecting and identifying narrow wavelengths of the electromagnetic spectrum comprising:

a housing having an open top and being impervious to penetrations of electromagnetic waves;

a plurality of electrically conductive pins extending through said housing;

a substrate affixed to the bottom of the inside of said housing and having an electrically conductive coating on its upper surface, said upper surface facing toward the open top of said housing, said coating connected by an electrically conductive wire to one of the aforementioned pins;

a plurality of photodetectors each having a first and second electrical pole and each photodetector being individually mounted on said substrate so that the photosensitive surface of each photodetector faces upward toward the open top of the housing and the first electrical pole of each photodetector makes contact with the electrically conductive coating on the substrate and the second pole of each photodetector is attached to only one of the plurality of pins;

a top cover positioned and sealed over the open top of said housing, said top cover being composed of a material which allows the transmission of electromagnetic wavelengths and said cover coated with a substance impervious to the penetration of electromagnetic wavelengths except for a plurality of uncoated areas, which uncoated areas admit electromagnetic wavelengths;

a plurality of narrow band optical filters each allowing passage of different known wavelength segments of the electromagnetic spectrum, each narrow band optical filter being affixed to the underside of the top cover directly below an uncoated area, said narrow band optical filter being larger than said uncoated area and each narrow band optical filter being positioned directly above the photosensitive area of one of the photodetectors so that the photodetectors are shielded from extraneous spectral components;

metering means attached to said pins for reading changes in the electrical output of each photodetector that is excited by an electromagnetic wave whereby said unknown electromagnetic wavelength can be identified by comparing it with the known wavelength admittance characteristics of the narrow band optical filter located above the excited photodetector.

2. A device as recited in claim 1 further including logic circuit means connected to said metering means.

3. A device as recited in claim 1 further including memory means connected to said metering means.

4. A device as recited in claim 1 further including logic circuit means and memory circuit means connected to said metering means.

5. A device as recited in claim 1 wherein said narrow band optical filters and the photodetectors which they cover are substantially sector-shaped and the array they form is of a substantially circular configuration.

6. A device as recited in claim 1 wherein at least one of said narrow band optical filters and its associated photodetector are of differing surface area from at least one other narrow band optical filter and its associated photodetector.

7. A device for optically detecting and identifying narrow wavelengths of the electromagnetic spectrum comprising:

a housing having an open top and being impervious to penetrations of electromagnetic waves;

a plurality of electrically conductive pins extending through said housing;

a substrate affixed to the bottom of the inside of said housing and having an electrically conductive coating on its upper surface, said upper surface facing toward the open top of said housing, said coating connected by an electrically conductive wire to one of the aforementioned pins;

a plurality of photodetectors each having a first and second electrical pole and each photodetector being individually mounted on said substrate so that the photosensitive surface of each photodetector faces upward toward the open top of the housing and the first electrical pole of each photodetector makes contact with the electrically conductive coating on the substrate and the second pole of each photodetector is attached to only one of the plurality of pins;

a top cover positioned and sealed over the open top of said housing, said top cover being composed of a material which allows the transmission of electromagnetic wavelengths and said cover coated with a substance impervious to the penetration of electromagnetic wavelengths except for a plurality of uncoated areas, which uncoated areas admit electromagnetic wavelengths;

a plurality of narrow band optical filters each allowing passage of different known wavelength segments of the electromagnetic spectrum, each narrow band optical filter being affixed to the underside of the top cover directly below an uncoated area, said narrow band optical filter being larger than said uncoated area and each narrow band optical filter being positioned directly above the photosensitive area of one of the photodetectors so that the photodetectors are shielded from extraneous spectral components.

* * * * *